United States Patent Office 3,036,046
Patented May 22, 1962

3,036,046
POLYMERIZATION OF PYRROLIDONE AND PIPERIDONE EMPLOYING N,N-DISUBSTITUTED URETHANES AS CHAIN INITIATORS
Samuel A. Glickman, Easton, and Edgar Shelley Miller, Bethlehem, Pa., assignors to General Aniline & Film Corporation, New York, N.Y., a corporation of Delaware
No Drawing. Filed Apr. 4, 1958, Ser. No. 726,338
6 Claims. (Cl. 260—78)

The present invention relates to the polymerization of 5- and 6-membered lactams, such as pyrrolidone and piperidone.

The polymerization of a lactam, such as pyrrolidone, proceeds via a ring-chain polymerization to give polyamides of 4-aminobutyric acid. Thus:

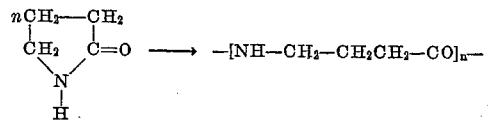

The recurring unit is one which might hypothetically arise in the condensation polymerization of 4-aminobutyric acid. However, early investigators, namely Gabriel (Berichte, 32, 1266 (1899)) and Schotten (Berichte, 21, 2240 (1880)), observed that 4-aminobutyric acid and 5-aminovaleric acid failed to undergo intermolecular condensation and yielded only the five and six-membered lactams. The first disclosure of such polyamides was that of U.S.P. 2,638,463 (W. O. Ney, W. R. Nummy and C. E. Barnes, May 12, 1953), involving the polymerization of pyrrolidone in the presence of an alkaline polymerization catalyst.

While useful polymers are obtained by the process described in the Ney, Nummy and Barnes patent, No. 2,638,463, considerable difficulty is encountered in obtaining these polymers in satisfactory yields; and, also, in the production of polymers having relatively high molecular weights. Patent No. 2,739,959, of Ney and Crowther, which, in Example I, discloses that only a small yield of low molecular weight polymer may be obtained when an alkaline polymerization catalyst is employed as the sole promoter of the polymerization of pyrrolidone, discloses effecting the alkaline polymerization of the lactam in the presence of a small amount of an acyl compound, as an activator for the alkaline polymerization catalyst; and, preferably, carrying out the polymerization of a lactam while dispersed in an anhydrous hydrocarbon non-solvent therefor, in order to increase the yield and molecular weight of the polymer. The specific activators described in Patent No. 2,739,959, as having the property of increasing the rate of polymerization of lactams having 5- and 6-membered rings, are acyl pyrrolidones, acyl dipyrrolidones, organic peroxides, anhydrous lactones, and alkyl esters. The Ney and Crowther patent discloses the use of these acyl compounds as activators for the alkaline polymerization catalyst.

We have now found that a particular class of N,N-disubstituted urethanes are capable of acting as chain initiators in the alkaline catalyzed polymerization of 5- and 6-membered lactams; e.g., of pyrrolidone and piperidone. This particular class of N,N-disubstituted urethanes has the role of initiating chain growth, whereby a novel type of polymer is produced. This novel class of N,N-disubstituted urethanes actually enters into the polymer chain. This function as a chain initiator is evidenced by the employ of a bromine containing precursor, wherein, as more fully described hereinafter, the use of para bromophenylchloroformate resulted in a polymer containing bromine in an amount calculated for on the basis of its complete entry into the polymer as a chain initiator.

The particular class of N,N-disubstituted urethanes which we have found to be useful for initiating the alkaline catalyzed polymerization of pyrrolidone and piperidone, are those having the following general formula:

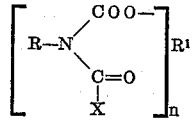

As indicated, the role of this substance is that of initiating chain growth, and, as a result, the group

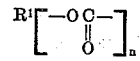

of the N,N-disubstituted urethane enters into the molecule of the polymer which is produced so that a novel polymer of the following general formula is obtained:

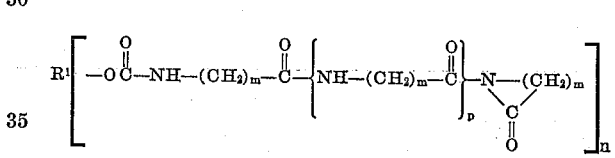

In the foregoing formulae and in other formulae appearing in this specification, the groups shown have the following means:

R=Alkyl or aryl
R¹=alkyl, aryl, alkylene, arylene or the residue of a polyfunctional chloroformate
X=arylamino, alkylamino, hydrogen, alkyl, aryl, alkoxy, aryloxy
m=3 or 4
n=3 or less
p=An integer from 1 to 1000, taken as an average
R+X=alkylene group to complete a ring (e.g. 2-pyrrolidone, 2-piperidone, E-Caprolactam.

N,N-disubstituted urethanes of the class described above, which are useful for initiating the alkali catalyzed polymerization of pyrrolidone and piperidone, may readily be prepared in most instances by the reaction of a mono- or polychloroformate with an appropriate compound containing a X—CO—NH— grouping, as the alkali metal salt or in the presence of an alkaline agent. Thus:

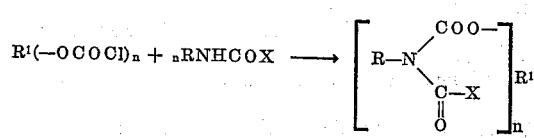

Specific compounds in the above class, which are useful as chain initiators, are shown in the following table:

| Compound | R | R' | X | R+X | Preparation-Literature Reference |
|---|---|---|---|---|---|
| N,N-dicarbethoxy aniline | Phenyl | Ethyl | Alkoxy | | Ber. 37,3681. |
| N-carbethoxy-1,3-diphenylurea | do | do | Arylamino | | Ber. 4,247. |
| N-carbethoxy-N-methyl-acetamide | Methyl | do | Methyl | | Rec. Trav. Chim. 9,142. |
| N-carbethoxy-N-methyl-formamide | do | do | Hydrogen | | N-Methyl urethane and anhydrous formic acid. |
| N-carbethoxy pyrrolidone | | do | | $-(CH_2)_3-$ | Chloroformic ester and sodio pyrrolidone. |
| Tetramethylene bis (pyrrolidone N-carboxylate) | | $-(CH_2)_4-$ | | $-(CH_2)_3-$ | Tetramethylene bis chloroformate and sodio pyrrolidone. |
| 1,2,6-Hexylene tri(pyrrolidone-N-carboxylate) | | $\begin{array}{c}CH_2\\|\\-CH\\|\\(CH_2)_3\\|\\CH_2\\|\end{array}$ | | $-(CH_2)_3-$ | 1,2,6-Hexylene tri chloroformate and sodio pyrrolidone. |
| Phenyl pyrrolidone-N-carboxylate | | ⌬— | | $-(CH_2)_3-$ | Phenyl chloroformate and sodio pyrrolidone. |
| p-Phenylene bis(pyrrolidone-N-carboxylate) | | —⌬— | | $-(CH_2)_3-$ | p-Phenylene chloroformate and sodio pyrrolidone. |
| Ethyl N-methyl-N-benzoyl urethane | Methyl | Ethyl | Phenyl | | Ethyl chloroformate and sodio N-methyl benzamide. |
| Tetramethylene bis (piperidone-N-carboxylate) | | $-(CH_2)_4-$ | | $-(CH_2)_4-$ | Tetramethylene bis chloroformate and sodio piperidone. |
| Tetramethylene bis (caprolactam-N-carboxylate) | | $-(CH_2)_4-$ | | $-(CH_2)_5-$ | Tetramethylene bis chloroformate and sodio caprolactam. |
| N-Carbethoxy-N-methyl-N'-butyl urea | Methyl | Ethyl | Butylamino | | Butyl isocyanate and N-methyl urethane—based on J.A.C.S. 71, 3746. |

It has been found that the N,N-disubstituted urethanes, which are effective for chain initiating the alkali catalyzed polymerization of pyrrolidone and piperidone, must be those of the general formula indicated above.

This specificity of substitution, requiring an N,N-disubstituted urethane of the class indicated, may be shown by a consideration of the employ of other compounds. Polymerizations attempted using $C_6H_5NHCOOC_2H_5$ (N-phenyl urethane), as a chain initiator, were unsuccessful, whereas the substitution of a carbethoxy radical to give N,N-dicarbethoxy aniline, led to a material capable of chain initiating the polymerization. In a similar fashion, $C_6H_5NHCOCH_3$ (acetanilide) failed as a chain initiator whereas the carbethoxy substitution product, N-carbethoxy acetanilide, demonstrated chain initiator activity.

The attempted polymerization of highly purified pyrrolidone, by means of an alkaline catalyst alone fails to give anything more than traces of polymer (in the order of 1% or less). The use in small amounts of a carbethoxy derivative,

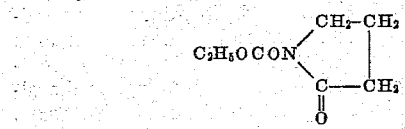

named N-carbethoxy-2-pyrrolidone, causes the polymerization to ensue. This, in addition to the cases reported above, demonstrates the requirement as to the specific nature of the substituted ureas which show chain initiator activity.

Whereas the above designation of certain N,N-disubstituted urethanes as chain initiators has been made, it has been shown that substances (herein called chain initiator precursors) capable of forming in situ substituted urethanes related to pyrrolidone may act to initiate the polymerization of alkaline pyrrolidone solutions. Thus, the class of chloroformates which react with pyrrolidone or piperidone to form carbethoxy derivatives demonstrates chain initiator activity. For example, ethyl chloroformate, reacting with pyrrolidone to form in situ N-carbethoxy pyrrolidone, acts as a chain initiator. The use of chloroformates resulting in the successful polymerization of pyrrolidone produces in situ compounds of the class of N,N-disubstituted urethanes, and is illustrated by the following equation

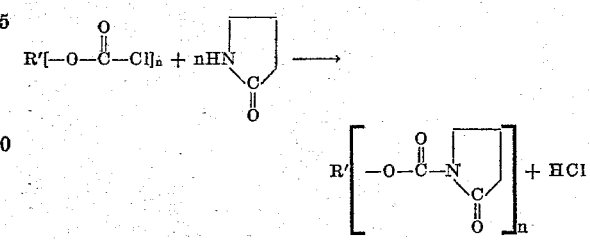

wherein R' is a hydrocarbon radical of valence n (i.e. the hydrocarbon residue of a chloroformate) and n is an integer from 1 to 3.

The use of di- and poly-chloroformates as chain initiators has made possible the preparation of high molecular weight polypyrrolidone since each chloroformate function serves to initiate a single chain. Thus, in the use of butanediol dichloroformate the polymer chains are linked through a group consisting of $$-OCO(CH_2)_4OCO-$$

In a similar fashion, there may be employed polychloroformates of other glycols, polyglycols and polyhydric phenols such as ethylene glycol dichloroformate, diethylene glycol dichloroformate, p-phenylene bischloroformate and the like.

It had been noted that the molecular weight of the polymer and its yield depended on the molar quantities of the chain initiator employed. In the employ of the polyfunctional chloroformates above, the use of a given molar quantity resulted in a higher molecular weight than that achieved with the same molar quantity of a monofunctional chloroformate, such as ethyl chloroformate. The advantage is considerable where one is seeking material of a high molecular weight.

The general conditions and factors utilized for polymerizing 5- and 6-membered lactams, pursuant to the present invention, may be those mentioned in U.S. Patent No. 2,739,959, except for the presence of an N,N-disubstituted urethane as the chain initiator for the polymerization, in place of the activators specified in that patent. In general, the method of effecting polymerization of 5- and 6-membered ring lactams, by the process of the present invention, is as follows:

Initially, there is the preparation of an anhydrous solution of the alkali pyrrolidone in pyrrolidone. The alkali pyrrolidone usually employed is sodio or potassio pyrrolidone, and may be obtained via the reaction of pyrrolidone with sodium and potassium metal or the respective hydroxides. In the latter case, it is essential to remove the water formed thereby as rapidly as possible. The concentration of the alkali pyrrolidone employed in many instances may vary from 0.5 to 5.0 mole percent (percentages based on pyrrolidone), and may range from 0.1 to 10.0 mole percent. In series of experiments, optimum yields were obtained with about 1.25 mole percent of alkali pyrrolidone. The role of the alkali pyrrolidone is that of a catalyst and serves as a source of pyrrolidone anions.

The amount of chain initiators employed in many instances may vary from 0.1 to 10.0 mole percent (percentage based on pyrrolidone). The concentration of chain initiator chosen, will depend on the conversion desired, and the molecular weight sought. The rate of the polymerization will depend, to a large extent, on the molar amount of chain initiator employed, the higher rates obtained by the use of greater amounts of chain initiator. The polymerizations may be chain initiated at temperatures from 25° C. to 65° C. and are accompanied by a mild exothermic reaction.

In a bulk or mass polymerization, the addition of the chain initiator is followed by a thickening of the solution and gradual solidification of the mixture. The toughness of the cake will, obviously, depend on the extent of the conversion and will be dependent on the times involved and amounts of chain initiators used.

The polymerization employing the foregoing chain initiators may be conducted on a dispersion of pyrrolidone, and the alkali pyrrolidone in a non-solvent for the pyrrolidone. Applicable non-solvents fall in the class of saturated and olefinic aliphatic alicyclic hydrocarbons, i.e., pentane, hexane, heptane, cyclohexane, pentene, cyclohexene, etc. The amount of non-solvent frequently employed is 1 to 3 parts of non-solvent per unit weight of pyrrolidone, but is subject to wide variation. The physical state of the resulting polymer obtained, via a dispersion polymerization may vary from a thick curd to a fine powder, depending on conversion desired, ratio of non-solvent and type as well as rate of agitation.

For the purposes of comparison, there are given below, as examples A and B, illustrations of the prior art polymerization of highly purified pyrrolidone, from the same batch, and purified in the same manner as the pyrrolidone used in the examples appearing later in the specification of the process of the present invention:

EXAMPLE A

A 500 cc. glass flask was charged with 100.0 grams (1.18 moles) of highly purified pyrrolidone. There is added 1.0 gram of potassium hydroxide flakes of 83% assay, the system immediately placed under a reduced pressure of 10 mm. and rapidly heated to the reflux point of 120 to 125° C. The vapors were condensed in a vertical reflux condenser, maintained at a jacket temperature of 75° C., thus permitting the return of the pyrrolidone and, at the same time, effecting the removal of water. After one hour at the reflux point, the reaction mixture in the still pot was cooled and the clear, colorless solution of potassio pyrrolidone in pyrrolidone allowed to stand for 24 hours at room temperature to the exclusion of atmospheric moisture and carbon dioxide. During the 24-hour period, the mixture became turbid and a scant amount of solid was deposited. The mixture was treated with 400 grams of distilled water, the solid filtered and thoroughly washed with water. The dried polymer weighed 0.6 gram, representing a conversion of 0.6%. The material was of low molecular weight, as indicated by the relative viscosity of a 1% solution in meta cresol.

EXAMPLE B

This example is an illustration of an alternate polymerization of highly purified pyrrolidone, and closely follows Example 1, of U.S. Patent No. 2,739,959, which is also an illustration of prior art polymerization of pyrrolidone.

A 500 cc. glass flask, equipped for vacuum distillation, was charged with 120.0 grams of highly purified pyrrolidone. There is added 1.0 gram of potassium hydroxied flakes of 83% assay. The system was immediately placed under a reduced pressure of 1.0 mm. and rapidly heated to effect the distillation at 90 to 100° C. of 20 grams of pyrrolidone and water. The resulting clear, colorless solution in the still pot constitutes a solution of potassio pyrrolidone in pyrrolidone. The solution was allowed to cool to room temperature and stand for 24 hours to the exclusion of atmospheric moisture and carbon dioxide. During this 24-hour period the mixture became turbid and a scant amount of solid was deposited. The contents was treated with 400 grams of distilled water, the solid filtered and thoroughly washed with water. The dried polymer weighed 0.5 gram, representing a conversion of 0.5%. The material was of low molecular weight as indicated by the relative viscosity of a 1% solution in meta cresol.

The details of the present invention will be apparent to those skilled in the art, from the following specific examples, of preferred methods of practicing the same:

*Example I*

A 300 cc. glass flask was charged with 50 grams (0.59 mole) of highly purified pyrrolidone. There was then added 0.5 gram of potassium hydroxide flakes of 83% assay, and the mixture immediately placed under a reduced pressure of 10 mm. and rapidly heated to the reflux point of 120–125° C. The vapors were condensed in a vertical reflux condenser, maintained at a jacket temperature of 75° C., thus permitting the return of the pyrrolidone, and, at the same time effecting the removal of water. After one hour at the reflux point, there was obtained a clear colorless solution of potassium pyrrolidone. To this solution at 50° C. was added 1.4 grams (0.0059 mole) of N,N-dicarbethoxyaniline ($C_6H_5N(COOC_2H_5)_2$), 58–62° C. (prepared according to the procedure of Diels and Nawiasky, Berichte, 37, 3681). The molar concentration of the chain initiator is 1.0% based on the pyrrolidone. In one minute the solution became turbid and in the course of three minutes took the form of a gel which underwent gradual hardening to a white tough mass. Precautions were taken to exclude moisture and carbon dioxide. After 24 hours, the solid was dissolved in 150 grams of 90% formic acid. The viscous solution was neutralized with aqueous caustic, the precipitated white solid filtered and thoroughly washed with water. The dry polyamide weighed 29.7 grams, representing a conversion of 59.4%. The relative viscosity of a 1% solution in m-cresol was 1.87, and the solid had a M.P. of 254–256° C. The thus obtained polymer had the following formula:

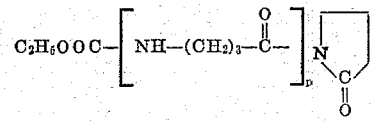

As an illustration of the specificity of substitution required in the N,N-disubstituted urethane, used as the chain initiator, the foregoing example was repeated, using 1.0 gram (0.0059 mole) of ethyl N-phenyl urethane, in place of N,N-dicarbethoxyaniline. Ethyl N-phenyl urethane represents the compound where the carbethoxy group is replaced by a hydrogen on the amide nitrogen of the N,N-disubstituted urethane. There was obtained some 3.0 grams of solid, representing a 6% conversion to low molecular weight material.

*Example II*

A solution of potassium pyrrolidone in 50 grams (0.59 mole) of pyrrolidone was prepared as described in Example I. To this solution at 50° C., was added 0.85 gram (0.003 mole) of N-carbethoxy-1,3-diphenylurea, prepared according to Berichte 4, 247; M.P. 98° C. The molar concentration was 0.5 mole percent based on pyrrolidone. After a 24 hour period, during which moisture and carbon dioxide were excluded, the solid contents were treated with water. The filtered, thoroughly washed material yielded 10.5 grams for a conversion of 21%. The relative viscosity of a 1% solution in m-cresol was 1.65.

As a further illustration of the specificity of substitution required in the chain initiator, the foregoing experiment was repeated, except that, in place of the N-carbethoxy-1,3-diphenyl urea, there was used 0.65 gram (0.003 mole) of 1,3-diphenyl urea. The latter compound represents the material wherein the carbethoxy group of the N,N-disubstituted urethane is replaced by a hydrogen atom. The scant amount of dry polymer obtained represented a 0.5% conversion to low molecular weight material.

*Example III*

A solution of potassium pyrrolidone in 50 grams (0.59 mole) of pyrrolidone was prepared as described in Example I. To this solution at 50° C., was added 0.44 g. (0.003 mole) of N-carbethoxy-N-methyl acetamide (prepared according to Klobbie, Rec. Trav. Chim. 9, 142; B.P. 189° C.). The molar concentration of chain initiator was 0.5 mole percent based on pyrrolidone. The solution was allowed to stand for 24 hours to the exclusion of moisture and carbon dioxide. The contents consisted of a soft solid which was treated with water and filtered. The thoroughly washed solid yielded 11.5 grams of dry polymer to account for a 23% conversion. The relative viscosity of a 1% solution in m-cresol was 1.74.

The following describes the attempted employ of N-methyl acetamide as a chain initiator. The failure to obtain any indication of chain initiation illustrates the specificity of substitution required for chain initiators. Note that N-carbethoxy-N-methyl acetamide, used above, is a chain initiator and represents the substitution of a carbethoxy group on the hydrogen atom of the nitrogen of inactive N-methyl acetamide.

A solution of potassium pyrrolidone in 100 grams (1.18 moles) of pyrrolidone was prepared as described in Example I. To this solution at 50° C. was added 0.88 gram (0.012 mole) N-methyl acetamide and the solution permitted to stand for 24 hours to the exclusion of moisture and carbon dioxide. During this period the solution had deposited a scant amount of solid. The contents were treated with water, the solid filtered and thoroughly washed with water. The dry polymer weighed 0.8 g., representing a conversion of 0.8%. The material was of low molecular weight as indicated by low relative viscosity of a 1% solution in m-cresol.

*Example IV*

Prepare a solution of potassium pyrrolidone in 100 grams (1.18 moles) of pyrrolidone, as described in Example I. To this, at 50° C., add 1.9 grams (0.012 mole) of N-carbethoxy-2-pyrrolidone. The molar concentration of the chain initiator is 1.0%. In a matter of minutes the solution thickens to a white paste and shortly forms a gel which progressively hardens. Allow this mixture to stand for 24 hours to the exclusion of moisture and carbon dioxide. Dissolve the resulting solid mass in 300 grams of 90% formic acid in the course of 24 hours stirring. Slowly pour the resulting viscous solution into 1800 grams of ice and water and allow to precipitate completely. The resulting polyamide polymer is filtered, washed free of formic acid by means of water and dried. A good yield of polymer, M.P. 253–255° C., is obtained.

In the foregoing Examples I to IV, inclusive, the N,N-disubstituted urethane, employed as the chain initiator was pre-formed, and added to the solution of potassium pyrrolidone in pyrrolidone. However, as previously indicated an N,N-disubstituted urethane, which is used as the chain initiator, may be formed in situ by adding a chloroformic acid ester to the solution of the potassio pyrrolidone in pyrrolidone. This method of operation is described in the following example:

*Example V*

A 300 cc. glass flask was charged with 50.0 g. (0.59 mole) of highly purified pyrrolidone. There is added 0.75 gram of potassium hydroxide flakes of 83% assay, the system immediately placed under a reduced pressure of 10 mm. and rapidly heated to the reflux point of 120–125° C. The vapors were condensed in a vertical reflux condenser, maintained at a jacket temperature of 75° C., thus permitting the return of the pyrrolidone and at the same time effecting the removal of water. After one hour at the reflux point, the reaction mixture in the still pot was cooled to 30° C. There was then added 0.27 gram (.0025 mole) of ethyl chloroformate. In a very short time the mixture became a thick white paste and in the course of ten minutes the contents was a soft dry solid, the temperature having risen to 46° in this interval. The mixture cooled gradually in the next 24 hours and set to a mass which was removed from the flask by means of methanol. The solid was thoroughly triturated with methanol to remove excess pyrrolidone and the resulting material then washed well with water and dried. There was obtained 16.5 g. of white solid polymer, M.P. 252–254°, in a conversion of 33% and possessing a relative viscosity of 1.86 for a 1% solution in m-cresol.

*Example VI*

The following illustrates the use of heptane in a non-solvent suspension polymerization of pyrrolidone, employing a chloroformate as the chain initiator-precursor.

A 500 cc. glass distilling flask was charged with 100.0 grams (1.18 moles) of highly purified pyrrolidone. There is added 1.65 grams of potassium hydroxide flakes of 83% assay, the system immediately placed under a reduced pressure of 10 mm. and rapidly heated to the reflux point of 120–125°. The vapors were condensed in a vertical reflux condenser, maintained at a jacket temperature of 75° C., thus permitting the return of the pyrrolidone and at the same time effecting the removal of water. After one hour at the reflux point, the reaction mixture in the still pot, comprising a solution of potassio pyrrolidone in pyrrolidone, was cooled to 30° C.

The above solution was added to 200 grams of anhydrous heptane in a suitably equipped reaction vessel. To the rapidly agitated mixture at 30° C., was added 1.10 g. (.010 mole) of ethyl chloroformate. In the course of 10 minutes the temperature had risen to 36° C. and the nature of the suspended material changed from a thick liquid to a soft powdery solid. After 24 hours of stirring at temperatures of 30-35° C., the solid was filtered, suspended in 300 ml. methanol to remove pyrrolidone, washed thoroughly with water and dried. The solid polyamide, M.P. 254-255° C., was obtained in a 56% conversion and had a relative viscosity of 2.25 for a 1% solution in m-cresol.

equipped reaction vessel containing 200 grams of anhydrous heptane. To the rapidly agitated mixture at 30° C. was added 0.94 gram (0.005 mole) of ethylene bis chloroformate. The temperature rose to 38° C. in the course of five minutes and the pyrrolidone-heptane suspension was replaced by a fine suspension of white soft solid in heptane. After 24 hours the mixture was filtered, triturated with methanol, washed with water and dried in vacuum oven. There was obtained 58 grams of white solid polymer, M.P. 252-254° C., giving a relative viscosity of 2.88 for a 1% solution in m-cresol. The thus obtained polymer had the following formula:

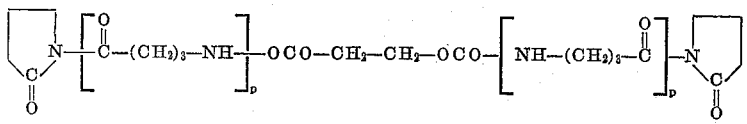

Example VII

The following example, utilizing p-bromophenyl chloroformate indicates clearly the chain initiating role it plays in the polymerization. The bromine analysis of the polymer permits a calculation which shows virtually complete entry into the polymer chain, presumably as the initiating molecule.

A solution of potassio pyrrolidone in pyrrolidone was prepared according to Example VI employing 100.0 g. (1.18 moles) of pyyrolidone and 1.4 grams of potassium hydroxide flakes of 83% assay. This solution was added to 200 grams of anhydrous heptane in a suitably equipped reaction flask. To the rapidly agitated mixture at 30° C. was added 1.4 grams (.006 mole) of p-bromophenyl chloroformate representing 0.5 molar percent. The temperature rose to 36° in a matter of minutes and the formation of a soft powdery white solid commenced. After 24 hours of agitation the mixture was filtered and the solid triturated in turn with methanol and water. The dry polymer weighed 42.0 grams for a conversion of 42% and had a relative viscosity of 2.08. The bromine analysis was 1.08 and 1.10 conducted on a semi-micro scale. Calculation shows that 95% of the bromine employed as p-bromophenyl chloroformate has entered the polymer chain presumably in the role of a chain initiator. The thus obtained polymer had the following formula:

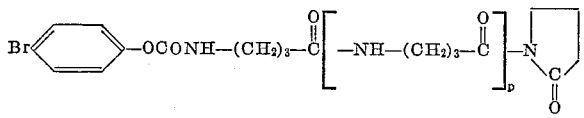

Example VIII

The following illustrates the use of a difunctional chain initiator precursor, in this case represented by ethylene bis chloroformate prepared according to the procedure of R. E. Oesper et al., J.A.C.S., 47, 2609 (1925). The use of this difunctional agent leads to polymers with a higher molecular weight at a given conversion then the corresponding polymers obtained through the use of a monofunctional chain initiator at the same conversion.

A solution of potassio pyrrolidone in 100 grams (1.18 moles) of highly purified pyrrolidone was prepared according to Example VI using 1.65 grams of potassium hydroxide flakes. This solution was added to a suitably

Example IX

The procedure of Example VIII was repeated employing as the difunctional chain initiator-precursor tetramethylene bis chloroformate, prepared according to the directons of W. Reppe, Annalen, 596, 60 (1955).

The employ of 0.4 molar percent tetramethylene bis chloroformate gave a 58% conversion to a polyamide possessing a relative viscosity of 3.03 for a 1% solution in m-cresol.

The above illustrates further the effect of a polyfunctional chain initiator in achieving material of high molecular weight, employing but small amounts of chain initiator. The polymer has the formula:

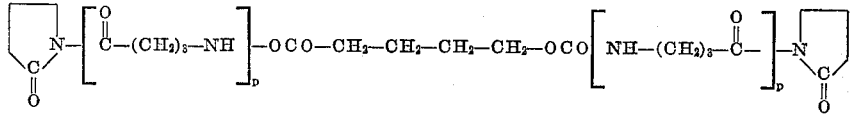

Example X

The following demonstrates the use of a difunctional chain initiator, tetramethylene bis (pyrrolidone N-carboxylate), prepared by the reaction of tetramethylene bis chloroformate with a dispersion of potassio pyrrolidone in toluene.

A solution of potassio pyrrolidone in 100 grams (1.18 moles) of pyrrolidone was prepared as described in Example III. To the above, at 50° C. was added 1.56 grams (.005 mole) of tetramethylene bis (pyrrolidone N-carboxylate) representing a molar concentration of chain initiator of .4%. The mixture rapidly thickened to a white gel and the temperature rose to 46° C. The mass was allowed to stand for 24 hours to the exclusion of carbon dioxide and moisture. The solid was dissolved in 300 grams of 90% formic acid in the course of 24 hours stirring. The viscous solution was slowly poured into 1800 g. of ice and water and allowed to precipitate completely. The resulting white polyamide polymer was filtered, washed free of formic acid by means of water and finally dried in a vacuum oven at 80° C. The conversion was 64% to a polymer, M.P. 253-255° C. with a relative viscosity of 2.93 as a 1% solution in m-cresol. The polymer has the same formula as that produced in Example IX.

Example XI

The procedure of Example VIII was repeated employing as the difunctional chain initiator precursor p-phenylene bis chloroformate, prepared according to the directions of R. E. Oesper et al., J.A.C.S., 47, 2609 (1925).

The employ of 0.4 molar percent p-phenylene bis chloroformate gave a 62% conversion to a polyamide possessing a relative viscosity of 3.32 as a 1% solution in m-cresol.

*Example XII*

The procedure of Example VIII was repeated employing as the chain initiator a tri-functional agent, 1,2,4-butanetriol-tri-chloroformate prepared according to the directions of U.S.P. 2,476,637.

The employ of 0.5 molar percent 1,2,4-butanetriol-tri-chloroformate led to a conversion of 66% of polyamide of relative viscosity 4.16 for a 1% solution in m-cresol.

*Example XIII*

Charge a 500 cc. glass flask with 99.0 grams (1.0 mole) of highly purified piperidone. Add 2.0 grams of potassium hydroxide of 83% assay; place the system immediately under a reduced pressure of 5 mm. and rapidly heat to the reflux point (120–125° C.). Condense the vapors in a vertical reflux condenser maintained at a jacket temperature of 75° C., thus permitting the return of piperidone and, at the same time, effecting the removal of water. After one hour at the reflux point, cool the reaction mixture in the still pot to 50° C. and treat the clear colorless solution with 0.94 gram (0.005 mole) of ethylene bis chloroformate, corresponding to .5 mole percent of chain initiator. Allow the solution which becomes a soft white mass in one hour to stand 24 hours to the exclusion of moisture and carbon dioxide. The hard mass is dissolved in 400 grams of 90% formic acid by stirring over a 24 hour period. The viscous solution is poured onto 2000 grams of water and the precipitated solid is filtered, thoroughly washed and then dried in a vacuum oven at 80° C. The polyamide thus obtained is believed to possess the formula:

means of an ester, such as —NH—CH$_2$CH$_2$CH$_2$COOCH$_3$ may be accomplished by treatment of the polymer intermediate, with methanol. In a similar fashion, treatment of the polymer obtained in the hexane suspension polymerization with an amine, such as aniline, yields an amide terminated function, of the type

Hydrolysis of the terminal ring may be accomplished by treating the alkaline containing white solid, obtained in the polymerization, with water at 75–80° C. for one hour. The resulting product is terminated by a

group. Conversion to the free acid, and, consequently to the other metal and ammonium salts, is accomplished by acidification and respective action of alkalizing agents.

The products of the present invention are, as indicated, polyamides of the nylon-4 type from pyrrolidone, or nylon-5 from piperidone; and, as such, are useful in the arts as in many applications of nylon. In particular, the products of the present invention, particularly, those of relatively high molecular weight, e.g., products which have a relative viscosity of about 2.5 or higher, as a 1% solution in the m-cresol, are useful for the production of fibers for textile and other uses—e.g., as insulating blankets, etc. Fibers have been successfully produced from products of the present invention, by drawing from a melt and spinning from solutions, such as solution in formic acid, followed by evaporation of solvent. Useful films, having a wide variety of applications, may also be produced from the products of the present invention by melt-extrusion, by film-casting from solutions, such as a

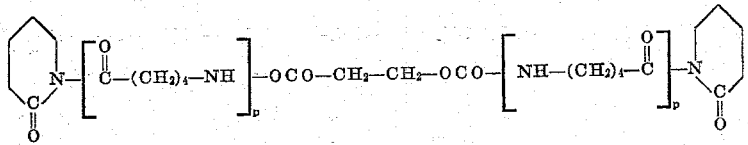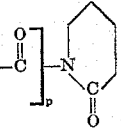

While an N-pyrrolidonyl, or N-piperidonyl group appears to be the usual chain-terminating group of the polymers obtained, pursuant to the present invention, it will be apparent to those skilled in the art, that the polymer chains may be otherwise terminated, for instance, by the formation of the acids and the metal and ammonium salts thereof, as well as esters and amides, which may arise by reaction of the active polymer intermediate with alkaline compounds, hydroxyl-containing compounds, or amines. Therefore, the polymers obtained, pursuant to the present invention, may, generically, be represented by the following general formula:

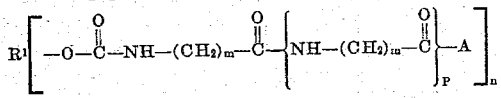

where A equals N-pyrrolidonyl, N-piperidonyl or —NH(CH$_2$)$_m$—COY radical where $m$ equals 3 or 4 and where Y represents oxymetal, hydroxyl, alkoxy, aryloxy, aralkoxy, oxyammonium, oxyaminium, amino, alkylamino, arylamino.

As samples of specific reagents, which may be employed to terminate the polymer chains, otherwise than in a pyrrolidonyl or piperidonyl radical, may be mentioned water, sodium hydroxide, sodium methylate, methanol, ethanol, phenol, ammonia, ethylamine, aniline, diethanolamine. Reaction of the free polymer acid with alkaline agents such as metal hydroxides and amines gives the respective salts. The various terminations proceed through scission of the terminal pyrrolidone ring, or one of the polyamide linkages, particularly the linkage between the terminal pyrrolidonyl linkage and the carbonyl grouping linked thereto. Termination of the polymer chain by formic acid solution, glycolic or lactic acid solution, followed by removal of the solvent. Such films are useful in numerous applications, including electrical applications, as an insulator; as a base for industrial tapes; as a lining material or glass replacement, and in a variety of special packaging applications. The products of the present invention may also be used in plastic compression molding and extrusion molding applications, where their crystaline nature, sharp melting point and marked fluidity, in the molten state, results in faithful reproduction of the mold. Molded products, for use as containers, may be produced from powders obtained pursuant to the present invention; and, also, many mechanical and other engineering parts and materials, such as gears, cams, bearings, and similar machine components may be produced from them. In the electrical arts, the products of the present invention are useful as a coating on wire, etc., as an insulation, and for the production of certain mechanical, electrical parts, such as insulating bushings, fuse holders, and the like. The products are also of interest in the coating arts as finishes for textiles, paper and similar fibrous materials, and for use as special adhesives and other coatings.

It should also be understood that the products of the present invention may be compounded in many applications with other synthetic plastic materials, plasticizers and fillers. Among the plasticizers, which have been found to be compatible with the products of the present invention, may be mentioned, o- and p-toluenesulfonamide, N-ethyl o- and p-toluenesulfonamide, ethylene carbonate and propylene carbonate.

While the production of polymers of 2-pyrrolidone and 2-piperidone has specifically been described in the foregoing examples it will be apparent that the process of the present invention may be employed for the production of polymers of homologues of 2-pyrrolidone and 2-piperidone which contain a lower alkyl (1–4 carbon atoms) substituent on the carbon atoms in the ring. Such alkyl substituted pyrrolidones and piperidones which have been found to be most readily polymerized by the process of this invention are those in which certain alkyl substituents in 3 and 4 position such as 3-methyl - 2 - pyrrolidone, 4-methyl-2-pyrrolidone, 4-ethyl-2-pyrrolidone, 3,3-dimethyl-2-pyrrolidone, 4,4-dimethyl-2-pyrrolidone, 3-methyl-2-piperidone, and 3-ethyl-2-piperidone. The alkyl substituted pyrrolidones and piperidones may be represented by the general formula

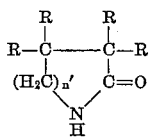

or

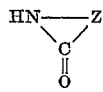

wherein Z represents

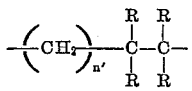

wherein $n'$ is one of the integers 1 and 2 and the R's represent a member of the group consisting of H and lower alkyl groups of 1 to 4 carbon atoms. The polymeric unit of the polymers produced on polymerizing them in accordance with the present invention may thus be represented by the general formula

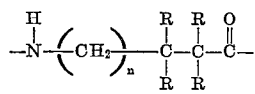

or

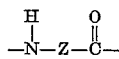

We claim:

1. In the process of polymerizing lactams of the formula:

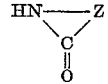

wherein Z is represented by

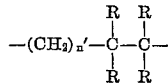

where $n'$ is an integer from 1 to 2 and R is a member of the group consisting of H and lower alkyl (1–4 carbon atoms) radicals, under essentially anhydrous conditions and in the presence of a minor amount up to about 10 mole percent of an alkali metal lactam as the polymerization catalyst; the improvement which comprises carrying out said polymerization in the presence of a minor amount up to about 10 mole percent based on said lactam of an N,N-disubstituted urethane of the formula

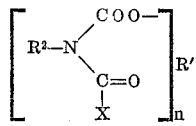

wherein R' is a hydrocarbon radical of valence $n$; $R^2$ is selected from the group consisting of alkyl and aryl groups and a bivalent alkylene group joined to bivalent X; X is a member of the group consisting of arylamino, alkylamino, hydrogen, alkyl, aryl, alkoxy, and aryloxy radicals and a bivalent alkylene radical joined to bivalent $R^2$ and, $R^2$ and X when bivalent represent an alkylene group of the formula Z as defined above and $n$ is an integer from 1 to 3.

2. In the process of polymerizing lactams of the formula:

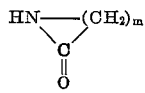

wherein $m$ is an integer from 3 to 4, under essentially anhydrous conditions and in the presence of a minor amount up to about 10 mole percent of an alkali metal lactam as the polymerization catalyst; the improvement which comprises carrying out said polymerization in the presence of a minor amount up to about 10 mole percent based on said lactam of an N,N-disubstituted urethane of the formula:

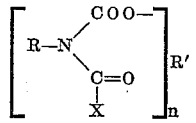

wherein R' is a hydrocarbon radical of valence $n$; R is a member of the group consisting of alkyl and aryl radicals and a bivalent alkylene radical joined to bivalent X; X is a member of the group consisting of hydrogen and arylamino, alkylamino, alkyl, aryl, alkoxy, aryloxy radicals and bivalent alkylene radical joined to bivalent R; and R and X together when bivalent form an alkylene group of the formula $\mathrm{-(-CH_2-)_m}$ as defined above, and $n$ is an integer from 1 to 3.

3. The process as defined in the preceding claim 2 wherein the polymerization chain initiator specified has the following formula:

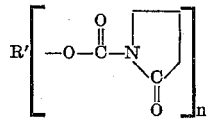

wherein R' is a hydrocarbon radical of valence $n$ and $n$ is an integer from 1 to 3.

4. A process as defined in claim 3, wherein the polymerization chain initiator specified is formed in situ, in the solution of alkali pyrrolidone in pyrrolidone by adding thereto an ester of chloroformic acid.

5. A process as defined in claim 4, wherein the ester of chloroformic acid is ethyl chloroformate.

6. A process as defined in claim 4 wherein the ester of chloroformic acid is tetramethylene bis chloroformate.

References Cited in the file of this patent
FOREIGN PATENTS
889,693    Germany _____ Sept. 14, 1953

UNITED STATES PATENT OFFICE
CERTIFICATE OF CORRECTION

Patent No. 3,036,046   May 22, 1962

Samuel A. Glickman et al.

It is hereby certified that error appears in the above numbered patent requiring correction and that the said Letters Patent should read as corrected below.

Column 6, line 66, before "58-62° C." insert -- m.p. --.

Signed and sealed this 16th day of October 1962.

(SEAL)
Attest:

ERNEST W. SWIDER
Attesting Officer

DAVID L. LADD
Commissioner of Patents